United States Patent
Wong et al.

(10) Patent No.: US 11,337,048 B2
(45) Date of Patent: May 17, 2022

(54) METHODS FOR DATA TRANSMISSION IN A MACHINE COMMUNICATION TERMINAL AND IN A BASE STATION

(71) Applicant: Alcatel Lucent, Boulogne Billancourt (FR)

(72) Inventors: Shin Horng Wong, Chippenham (GB); Seau Sian Lim, Swindon (GB); Yu Chen, Shanghai (CN); Matthew Baker, Canterbury (GB)

(73) Assignee: Alcatel Lucent, Nozay (FR)

( * ) Notice: Subject to any disclaimer, the term of this patent is extended or adjusted under 35 U.S.C. 154(b) by 619 days.

(21) Appl. No.: 15/513,310

(22) PCT Filed: Sep. 9, 2015

(86) PCT No.: PCT/IB2015/001928
§ 371 (c)(1),
(2) Date: Mar. 22, 2017

(87) PCT Pub. No.: WO2016/046628
PCT Pub. Date: Mar. 21, 2016

(65) Prior Publication Data
US 2017/0245094 A1   Aug. 24, 2017

(30) Foreign Application Priority Data
Sep. 26, 2014   (CN) .......................... 201410502750.9

(51) Int. Cl.
*H04W 72/04*   (2009.01)
*H04W 88/08*   (2009.01)
(Continued)

(52) U.S. Cl.
CPC ............. *H04W 4/70* (2018.02); *H04L 5/0091* (2013.01); *H04W 72/042* (2013.01);
(Continued)

(58) Field of Classification Search
CPC ... H04W 4/0005; H04W 4/70; H04W 72/042; H04W 72/0453; H04W 88/08; H04L 5/0091
See application file for complete search history.

(56) References Cited

U.S. PATENT DOCUMENTS

2013/0308572 A1* 11/2013 Sayana ................ H04W 28/06
370/329
2013/0315159 A1   11/2013 Xia et al.
(Continued)

FOREIGN PATENT DOCUMENTS

CN   103220691 A   7/2013
CN   103227694 A   7/2013
(Continued)

OTHER PUBLICATIONS

3GPP TR 36.888, V12.0.0, discuss provision of low-cost Machine-Type Communications (MTC) User Equipment (UEs) based on LTE. (Year: 2013).*
(Continued)

*Primary Examiner* — Un C Cho
*Assistant Examiner* — Peter K Mak
(74) *Attorney, Agent, or Firm* — Fay Sharpe LLP

(57) ABSTRACT

The present invention provides a method for data transmission in a machine type communication device terminal, comprising: performing the following when the terminal receives cell common message: A. receiving first indication information from an EPDCCH on a first resource block, the first indication information indicating a second resource block for transmitting the cell common message; B. receiving the cell common message from a PDSCH on the second resource block; performing the following when the terminal receives downlink data: I. receiving second indication information from EPDCCH on a third resource block; II. detecting whether DCI information transmitted to the terminal
(Continued)

exists in the second indication information, and if the DCI information transmitted to the terminal exists, II-1. decoding information of a fourth resource block in the DCI information; II-2. receiving the downlink data transmitted from the base station to the terminal from the PDSCH on the fourth resource block.

20 Claims, 3 Drawing Sheets

(51) Int. Cl.
    *H04W 4/70*            (2018.01)
    *H04L 5/00*             (2006.01)

(52) U.S. Cl.
    CPC ... *H04W 72/0446* (2013.01); *H04W 72/0453* (2013.01); *H04L 5/0053* (2013.01); *H04W 88/08* (2013.01)

(56) References Cited

U.S. PATENT DOCUMENTS

| | | | |
|---|---|---|---|
| 2014/0204849 A1 | 7/2014 | Chen et al. | |
| 2014/0328260 A1* | 11/2014 | Papasakellariou | H04L 1/1887 370/329 |
| 2015/0092690 A1* | 4/2015 | Seo | H04W 72/042 370/329 |
| 2015/0230249 A1* | 8/2015 | Nguyen | H04W 72/042 370/329 |
| 2016/0174014 A1* | 6/2016 | You | H04B 7/2656 370/312 |
| 2016/0191209 A1* | 6/2016 | Morioka | H04L 1/02 370/328 |
| 2016/0309470 A1* | 10/2016 | Yi | H04W 72/0446 |

FOREIGN PATENT DOCUMENTS

| | | |
|---|---|---|
| WO | 2013000645 A1 | 1/2013 |
| WO | WO 2014/045472 A1 | 3/2014 |
| WO | WO 2014/068393 A1 | 5/2014 |

OTHER PUBLICATIONS

International Search Report for PCT/IB2015/001928 dated Jan. 29, 2016.
English Bibliography for Chinese Patent Application Publication No. CN103220691A, published Jul. 24, 2013, printed from Derwent innovation on May 18, 2018, 4 pp.
English Bibliography for Chinese Patent Application Publication No. CN103227694A, published Jul. 31, 2013, printed from Derwent innovation on May 18, 2018, 3 pp.
PCT Pat. App. No. PCT/IB2015/001928, Written Opinion of the International Searching Authority, dated Jan. 29, 2016, 5 pp.
3rd Generation Partnership Project; Technical Specification Group Radio Access Network; Evolved Universal Terrestrial Radio Access (E-UTRA); Physical layer procedures (Release 12), 3GPP TS 36.213 V12.2.0, pp. 138-143 and 199-200, (Jun. 2014).

* cited by examiner

METHODS FOR DATA TRANSMISSION IN A MACHINE COMMUNICATION TERMINAL AND IN A BASE STATION

FIELD OF THE INVENTION

The present invention relates to the field of wireless communication, and more specifically, the present invention relates to methods for data transmission in a machine communication device terminal and in a base station.

BACKGROUND OF THE INVENTION

Machine Type Communication (MTC) device is a user equipment that is used by a machine for specific application. An example of such an MTC device is smart meter. Some of these smart meters are located in a basement, which suffer from high penetration loss and therefore it is difficult for the MTC device to communicate with the network. In Rel-12 international standards, a work Item for Low Cost MTC UE is specified with the aim of reducing the UE cost by 50% by:
1) Reduce to 1 Rx antenna
2) Limit TBS in downlink and uplink for unicast to 1000 bits In Rel-13, the cost of the MTC device is further reduced by another 50% over the setting in Rel-12. One of the main features in reducing the cost is restricting the MTC device RF bandwidth below 1.4 MHz. That is why the UE is constraint to use only 6-7 PRBs (for transmitting control information and data) in the downlink and uplink.

PDCCH is generally used to carry common control channels. Low-cost machine type communication (LC-MTC) UE is expected to co-exist with legacy UE in any system bandwidth. Hence, for system bandwidth >1.4 MHz, the frequency band of the PDCCH cannot be used by LC-MTC UE since PDCCH spans the entire system bandwidth. A straightforward method is to introduce EPDCCH for common control channels.

EPDCCH can occupy up to 8 PRBs and would therefore consume a significant amount of resources in Rel-13 LC-MTC UE. Even in the extreme where EPDCCH occupies only 1 PRB, which would take 16% of total resource and the remaining resources need to be used for data and other control messages e.g. SIB. The technical problem to solve is to find an efficient way of transmitting EPDCCH.

A new work item is approved for Rel-13 on low cost MTC. It is required by the work item that low cost MTC shall support a maximum 1.4 MHz bandwidth as well as frequency multiplexing. This means the MTC UE should support frequency switching because it at least needs switching from the subband carrying SIB to its traffic subband. By supporting frequency switching, the low cost MTC UE works in a similar way as half duplex FDD. The UE only needs a filter to receive the 1.4 MHz subband. Considering the cost mainly from the bandwidth and frequency switching, finally RAN plenary decides to support this feature. It should also be appreciated that from the perspective of system efficiency (especially for operators and network vendors), the ability to spread the traffic load of the low cost MTC UE over the entire system bandwidth is essential.

SUMMARY OF THE INVENTION

In view of the above problems, it is essential to provide solutions for data transmission in a machine type communication device terminal and in a base station.

In order to achieve the objective of the present invention, a first aspect of the present invention provides a method for data transmission in a machine type communication device terminal, comprising steps of: performing the following steps when the terminal receives cell common message: A. Reclining first indication information from an EPDCCH on a first resource block, wherein the first indication information indicates a second resource block for transmitting the cell common message; B. receiving the cell common message from a PDSCH on the second resource block; performing the following steps when the terminal receives downlink data: I. receiving second indication information from EPDCCH on a third resource block; II. detecting whether DCI information transmitted to the terminal exists in the second indication information, and if the DCI information transmitted to the terminal exists, II-1. decoding information of a fourth resource block in the DCI information; II-2. receiving the downlink data transmitted from the base station to the terminal from the PDSCH on the fourth resource block.

In particular, the first resource block, the second resource block, the third resource block, and the fourth resource block are located on different time slots.

In particular, a location of the first resource block in a frequency band is predetermined, while a location of the third resource block in the frequency band is notified by the base station.

In particular, the first resource block and the third resource block are located on a same frequency band.

In particular, the third resource block and the fourth resource block are located on a same frequency band.

In particular, the step S further comprises detecting the second indication information by the following equation:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i$$

where the $N_{ECCE}$ denotes a number of the ECCEs in the third resource block.

A second aspect of the present invention provides a method for data transmission in a base station, the base station being for transmitting data to a plurality of machine type communication device terminal, comprising steps of: performing the following steps when the base station transmits cell common message to the plurality of machine type communication device terminals: a. transmitting first indication information in EPDCCH on a first resource block, the first indication information indicating a second resource block for transmitting the cell common message; b. transmitting the cell common message in PDSCH on the second resource block; performing the following steps when the base station transmits the cell common message to the plurality of machine type communication device terminal: i. assigning a downlink resource block for each machine type communication device terminal that needs to obtain downlink data; ii. transmitting second indication information in the EPDCCH on a third resource block, the second indication information including DCI information transmitted to terminals that need to obtain downlink data, respective DCI information indicating the downlink resource block assigned by the base station; iii. transmitting downlink data to terminals that need to obtain the downlink data in the PDSCH on the downlink resource block, respectively.

In particular, DCI information of the plurality of terminals is transmitted on the third resource block by frequency-division multiplexing.

In particular, DCI information of the plurality of terminals is transmitted on the third resource block by time-division multiplexing.

In particular, DCI information of the plurality of terminals is transmitted for multiple times on the third resource block by time-division multiplexing.

In particular, the first resource block, the second resource block, the third resource block, and the downlink resource block are located on different time slots.

In particular, a location of the first resource block in the frequency band in the frequency band is predetermined, and a location of the third resource block in the frequency band is notified by the base station to the plurality of machine type communication device terminals.

In particular, the first resource block and the third resource block are located on the same frequency band.

In particular, there further comprise steps of: transmitting third indication information in an EPDCCH on the fifth resource block, wherein the third indication information includes a sixth resource block for transmitting the cell common message; wherein the first resource block and the fifth resource block are located on a same frequency band, and the first resource block and the fifth resource block are located on adjacent timeslots; the second resource block and the sixth resource block are located on a same frequency band, and the second resource block and the sixth resource block are located on adjacent time slots.

In particular, locations of the first resource block and the fifth resource block in the frequency band and time slot are notified by the base station to corresponding machine type communication device terminals, respectively.

In view of the above, the methods according to the present invention perform efficient data transmission between the LC-MTC and the base station when the bandwidth of resource blocks is not wide enough, enhance the utilization of communication resources, and reduce device cost of MTC.

BRIEF DESCRIPTION OF THE ACCOMPANYING DRAWINGS

Through reading the detailed description of the non-limiting embodiments with reference to the accompanying drawings, other features, objectives and advantages of the present invention will become more apparent:

DETAILED DESCRIPTION OF THE PREFERRED EMBODIMENTS

In specific description of the following preferred embodiments, accompanying drawings constituting a part of the present invention will be referenced. The accompanying drawings show specific embodiments capable of implementing the present invention in an exemplary manner. The exemplary embodiments are not intended to exhaust all embodiments according to the present invention. It would be appreciated that without departing from the scope of the present invention, other embodiments may be utilized or subject to structural or logical modifications. Therefore, the following specific description is non-limitative, and the scope of the present invention is limited by the appending claims.

Hereinafter, methods of performing data transmission in a machine type communication device terminal and in a base station will be illustrated in conjunction with the accompanying drawings. It should be noted that although the description describes steps of the methods in a specific sequence, this does not require or imply these operations should be executed according to the specific sequences, or a desired result can only be achieved by performing all of the illustrated operations; on the contrary, the described steps may be changed in their execution sequence. Additionally or alternatively, some steps may be omitted, a plurality of steps may be combined into one step for execution, and/or a step may be decomposed into a plurality of steps for execution.

Figure 1:
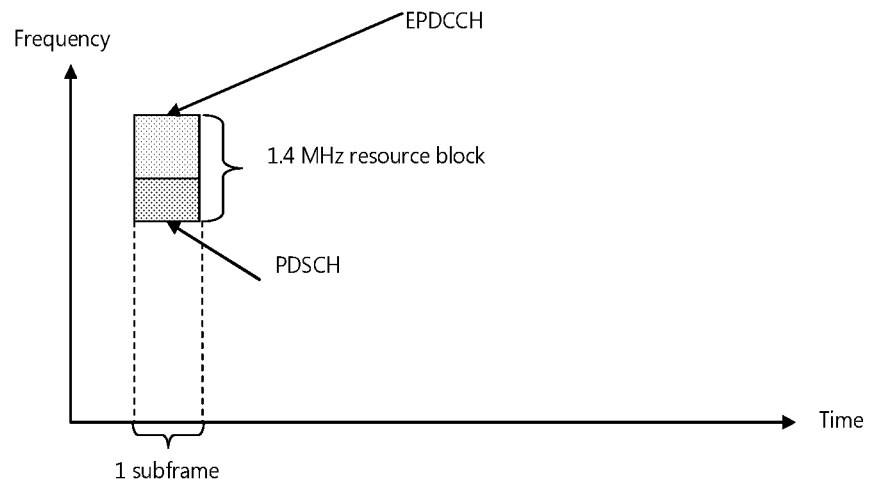
FIG. 1 shows an existing resource block allocation diagram of for implementing data communication on a resource block with a 1.4 MHz bandwidth.

As shown in FIG. 1, a potential solution for solving the above technical problem comprises: transmitting EPDCCH and PDSCH on a same 1.4 MHz, wherein an EPDCCH search space equation needs to be modified, such that an area for searching the EPDCCH may fall into the resource block of the 1.4 MHz bandwidth. However, this solution is rather constraint on the capacities of the EPDCCH and PDSCH and cannot support EPDCCH having a higher AL and a larger information size carried by the PDSCH.

A solution for resolving RF bandwidth limitation comprises: frequency-division multiplexing frequency resources of different LC-MTC user equipments on a system bandwidth, thereby efficiently utilizing the frequency resources. Therefore, the LC-MTC user equipments are desired to be capable of implementing a switching frequency (e.g., switching from a 1.4 MHz resource block to another 1.4 MHz resource block). Besides, there also comprises time-division multiplexing time resources of different LC-MTC user equipments on the system bandwidth, thereby effectively utilizing the time resources. A basic thought of the present solution is time-division multiplexing or frequency-division multiplexing the EPDCCH resources.

Different from the specification in Rel-12, in the present invention, the EPDCCH may carry indication information indicating a resource block for transmitting downlink data of the user equipment or carry indication information indicating a resource block for transmitting cell common message, wherein the cell common message does not include RAR and MIB.

When the EPDCCH carries indication information indicating a resource block for transmitting downlink data of the user equipment (the indication information is located in the DCI information corresponding to respective MTC terminals). In order to enable respective MTC user equipments to blind detect respective DCI information from the EPDCCH, the search space of the EPDCCH needs to be redefined. We recommend starting to define the search space from the lowest PRV of the resource block (1.4 MHz) bandwidth. The search space of the EPDCCH defined in 3GPP TS36.213 is defined as follows:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i$$

For the LC-MTC in the present invention, $Y_{p,k}$ is defined to 0, $N_{ECCE}$ denotes a number of ECCEs in the resource block that transmits EPDCCH.

Hereinafter, methods for performing data transmission in a machine type communication device terminal and in a base station as disclosed in the present invention will be introduced in detail by the present invention.

Generally, the data that needs to be transmitted to the user equipment may be divided into cell common message and user data. The cell common message is transmitted to all user equipments so as to notify all user equipments of cell basic parameters, while the user data are downlink data transmitted to a specific user equipment. In the present invention, the cell common message does not include RAR and MIB, while the EPDCCH is used for transmitting, to the MTC user equipment, indication information indicating in which resource block, respective MTC user equipments obtain the cell common message or user data.

When it is needed to transmit cell common message between an MTC user equipment and the base station:

The base station transmits first indication information in the EPDCCH on a first resource block, the first indication information indicating a second resource block for transmitting the cell common message; then, the base station transmits the cell common message in a PDSCH on the second resource block.

Correspondingly, at the MTC user equipment side, the user equipment receives first indication information from an EPDCCH on the first resource block, wherein the first indication information indicates a second resource block for transmitting the cell common message. Then, based on the indication of the first indication information, at a corresponding time slot, the receive frequency of the user equipment is switched to the frequency band where the second resource block is located, thereby receiving the cell common message in a PDSCH on the second resource block.

When it is needed to transmit downlink data between an MTC user equipment and a base station:

The base station allocates a corresponding downlink resource block to each machine type communication device terminal that needs to obtain downlink data. Then, the base station transmits second indication information in the EPDCCH on the third resource block, wherein the second indication information includes a plurality of DCI information, each DCI information corresponding to a terminal that needs to obtain downlink data, respective DCI information indicating a downlink resource block allocated by the base station and corresponding to the terminal. Then, the base station transmits downlink data to the corresponding terminals in the PDSCH on the downlink resource block, respectively.

Correspondingly, at the MTC user equipment side, the user equipment receives second indication information from the EPDCCH on the third resource block; then, the user equipment detects, in the second indication, whether DCI information transmitted to the terminal per se exists. If the DCI information transmitted to the terminal per se, then, information of the fourth resource block (corresponding to the downlink resource block mentioned above) is decoded out of the DCI information, the information including, e.g., frequency band, time slot, etc. In the corresponding time slot, the user equipment switches the receive frequency to the frequency band where the fourth resource block is located, thereby receiving the downlink data transmitted from the base station to the terminal from the PDSCH on the fourth resource block. If the DCI information transmitted to the present terminal does not exist in the second indication information, the terminal ignores the second indication information.

Figure 2:
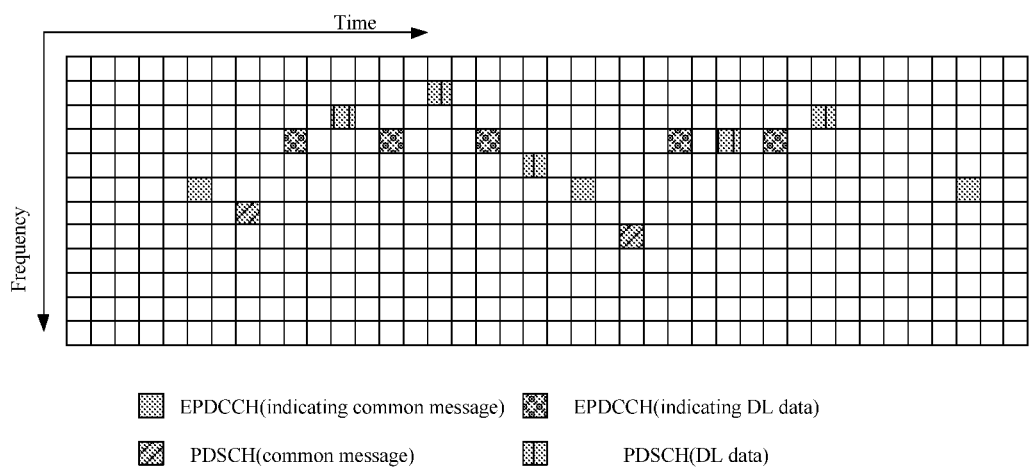
FIG. 2 shows a resource block allocation diagram according to one embodiment in a method disclosed by the present invention.

In a specific embodiment, as shown in FIG. 2, the cell common message originally indicated by the PDCCH to a common user is now indicated to the LC-MTC through the EPDCCH. In a preferred embodiment, for the LC-MTC, the cell common message is only periodically transmitted, e.g., each 40 ms. The EPDCCH for indicating the resource block where the cell common message is located and the EPDCCH for indicating the resource block where the downlink data is located are not on the same timeslot. When the user terminal is switched from a resource block on one frequency band is switched onto another frequency band, a certain time is always needed. Therefore, in the present invention, when a user equipment MTC is switched from a resource block on one frequency band to a resource block on another frequency band, an interval of one time slot is needed. Therefore, there is only time slot gap between the MTC user equipment receiving a resource block (a first resource block/third resource block) of indication information on the EPDCCH and receiving a resource block (a second resource block/a fourth resource block) of data on the PDSCH. Likewise, there is also at least one time slot gap between the first resource block (indicating cell common message) and the third resource block (indicating downlink data) corresponding to different indication information. The interval also enables the MTC user equipment to have enough time for performing frequency switching.

The location of the first resource block corresponding to the EPDCCH indicating the cell common message in the frequency band may be agreed in advance, and the location of the third resource block corresponding to the EPDCCH indicating downloaded data in the frequency band may be notified to the MTC user equipment by the base station.

The user terminal may obtain, from the EPDCCH indicating the cell common message, the time slot and frequency band information where the second resource block transmitting the cell common message is located, and obtains the cell common message from the PDSCH on the corresponding second resource block. Likewise, the user equipment may obtain, from the EPDCCH indicating cell downlink data, the time slot and frequency band information where the fourth resource block transmitting the downlink data is located, and obtain the downlink data from the PDSCH on the corresponding fourth resource block. Because a plurality of MTC user equipments may share one EPDCCH, respective user equipments obtains, in the EPDCCH indicating the cell downlink data, the timeslot and frequency band information where the resource blocks of respective terminals for transmitting downlink data are located by blind detecting.

In another embodiment, the plurality of MTC user equipments as mentioned above may share an EPDCCH for scheduling. For S-RNTI or P-RNTI, because different users may access the EPDCCH at different times to obtain the indication information, such that different user equipments may be made to obtain the EPDCCH indicating the cell common message on resource blocks of different time slots but at the same frequency band. Because the user is in a cell access mode, the base station knows when the user may receive the indication information in the EPDCCH. This manner will not waste too many resources. Because generally the LC-MTC user works similar to the method of EPDCCH→PDSCH→EPDCCH→, the PDSCH having the cell common message is only needed to be broadcast twice for implementing transmission to the user terminal. For RA-RNT1, because all users simultaneously monitor the EPDCCH indicating the cell common message, extra repetition is not needed.

Hereinafter, it will be introduced in detail how to enable a plurality of LC-MTC UEs to share an EPDCCH in one resource block by frequency-division multiplexing or time-division multiplexing.

Figure 3:
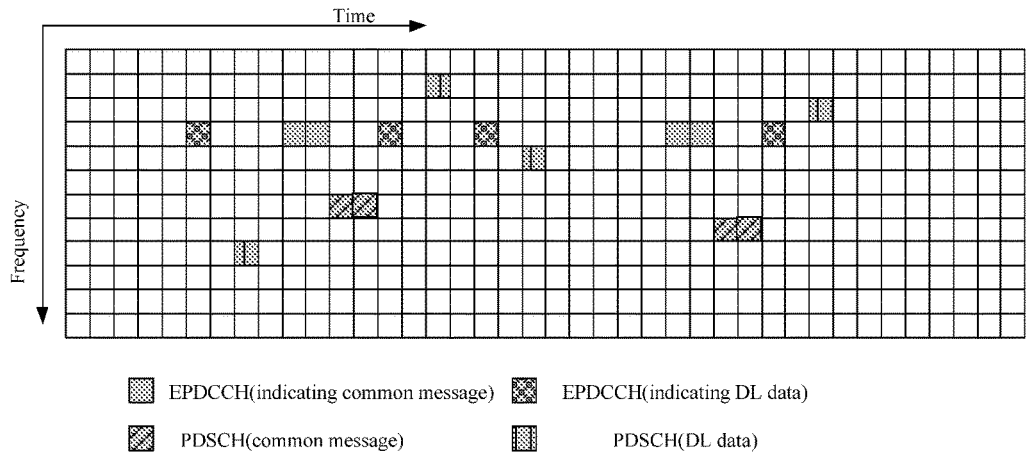
FIG. 3 shows a resource block allocation diagram according to another embodiment in a method disclosed by the present invention.

In an embodiment of frequency-division multiplexing, EPDCCH corresponding to a plurality of MTC user equipments is allocated in one resource block, while PDSCH corresponding to a plurality of MTC user equipments is allocated in different frequency blocks corresponding to the terminals. The location of an EPDCCH resource block (the third resource block) is transmitted to the user through a message. As shown in FIG. 3, here, the user is first switched to the third resource block (1.4 MHz) comprising EPDCCH and performs decoding in the third resource block so as to obtain DCI. The DCI in the EPDCCH will indicate a (1.4 MHz) fourth resource block comprising PDSCH. Here, we assume that the LC-MTC user equipment will be switched from one (resource block) frequency to another (resource block) frequency using about one subframe. Once the user is switched to the frequency containing the PDSCH resource block, it may start decoding the PDSCH. When the user reads the EPDCCH information in one subframe (resource block) and performs PDSCH decoding in another subframe (resource block), cross-subframe scheduling needs to be introduced.

Figure 4:
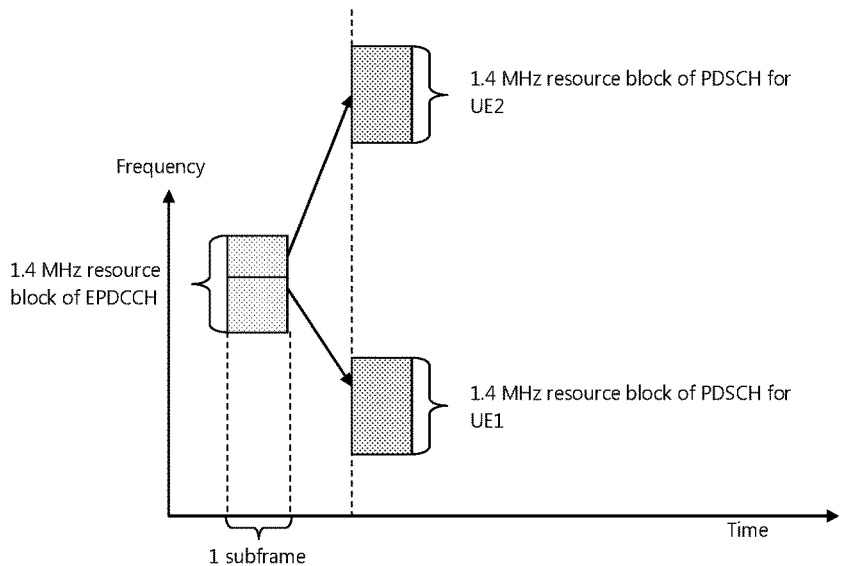
FIG. 4 shows a schematic diagram of implementing downlink data transmission according to one method disclosed by the present invention.
Figure 5:
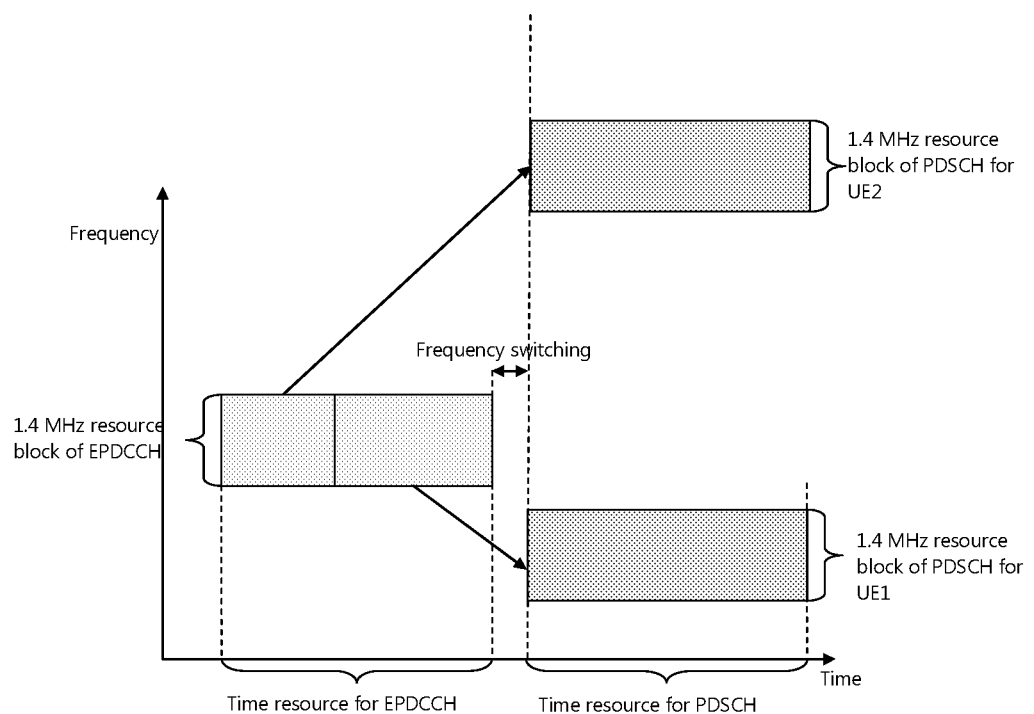
FIG. 5 shows a schematic diagram of implementing downlink data transmission according to another method disclosed by the present invention.

In another embodiment of time-division multiplexing, a time resource block in one frequency is allocated to the EPDCCH and another time resource block is allocated to the PDSCH. As shown in FIG. 4, here, a known time resource block is allocated to the EPDCCH. The user terminal will perform blind detection in these subframes. If the DCI of the MTC user terminal exists, the MTC user terminal will obtain the time and frequency for scheduling the PDSCH resource block from the DCI. The resource block may span a plurality of subframes, rather than only comprising one subframe. This corresponds to increase of the total resources of the EPDCCH, i.e., NECCE.

The embodiment of time-division multiplexing may be combined with a coverage enhancement technology. In the resource block carrying EPDCCH, the EPDCCH may be repetitively transmitted to a specific MTC user equipment. Similarly, in a resource block carrying PDSCH, PDSCH may also be repetitively transmitted to a specific MTC user equipment. Specifically, the EPDCCH indicates a PDSCH resource block having a plurality of subframe bundles. The size of subframe bundles is defined by the base station, which may include one repetition or a plurality of repetitions, and the entire repletion may be divided into one to more subframe bundles. The base station may indicate the resource blocks of respective subframe bundles, i.e., one EPDCCH indicating multiple bundles of subframes. This method will reduce the amount of PRBs used by the EPDCCH in one (1.4 MHz) resource block, such that the PDSCH/MIB may be transmitted in a 1.4 MHz block.

In another embodiment, as a recommended special solution or a direct solution, the system may select resource blocks having a same frequency band to transmit the PDSCH, but different frequency switching intervals are still reserved for maintaining a uniform time relationship. When the user's PDSCH is later scheduled to another frequency, this is very useful for simplifying the steps.

In another embodiment, the resource blocks indicated by the EPDCCH may have a plurality of subframes, e.g., N subframes. Moreover, during the subsequent transmission process, after the user terminal decodes its DCI, the user terminal will automatically receive the PDSCH in the resource block. This is very helpful in reducing signaling overheads. Because the channel variation is very slow, the mass of a preferred resource block may be persistent for tens of milliseconds.

It should be noted that although the bandwidth of the resource block here takes an example of 1.4 MHz, it is not limited to 1.4 MHz, and the bandwidth may be greater or less than 1.4 MHz.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; besides, it is apparent that the term "comprise" does not exclude other units or steps, and singularity does not exclude plurality. A plurality of units or modules stated in an apparatus claim may also be implemented by a single unit or module through software or hardware. Terms such as the first and the second are used to indicate names, but do not indicate any particular sequence.

The invention claimed is:

1. A method for receiving data transmission in a machine type communication device terminal, comprising:
    performing the following when the machine type communication device terminal receives a first portion of a data transmission in a cell common message from a base station:
        receiving first indication information at the machine type communication device terminal from the base station via an EPDCCH on a first resource block, wherein the first indication information indicates a second resource block for receiving the first portion of the data transmission in the cell common message from the base station via a PDSCH; and
        receiving the first portion of the data transmission in the cell common message at the machine type communication device terminal from the base station via the PDSCH on the second resource block; and
    performing the following when the machine type communication device terminal receives a second portion of the data transmission in downlink data from the base station:
        receiving second indication information at the machine type communication device terminal from the base station via the EPDCCH on a third resource block;
        detecting whether DCI information exists in the second indication information and, if the DCI information exists, decoding identifying information of a fourth resource block in the detected DCI information for receiving the second portion of the data transmission in the downlink data rom the base station via the PDSCH; and
        receiving the second portion of the data transmission in the downlink data at the machine type communication device terminal from the base station via the PDSCH on the fourth resource block.

2. The method according to claim 1, wherein the first resource block, the second resource block, the third resource block, and the fourth resource block are located on different time slots.

3. The method according to claim 2, wherein a location of the first resource block in a frequency band is predetermined, and a frequency band location of the third resource block is notified by the base station.

4. The method according to claim 2, wherein the first resource block and the third resource block are located on a same frequency band.

5. The method according to claim 2, wherein the third resource block and the fourth resource block are located on a same frequency band.

6. The method according to claim 1, further comprising detecting DCI information in the second indication information received from the EPDDCH on the third resource block using the following equation defined in 3GPP TS 36.213 V12.2.0 to define a search space for the third resource block:

$$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k} / L \rfloor\right\} + i$$

wherein $N_{ECCE}$ denotes a number of ECCEs in the third resource block.

7. The method according to claim 1, wherein DCI information is transmitted on the third resource block by frequency-division multiplexing.

8. The method according to claim 1, wherein DCI information is transmitted on the third resource block by time-division multiplexing.

9. The method according to claim 8, wherein DCI information is transmitted for multiple times on the third resource block by time-division multiplexing.

10. The method according to claim 1, further comprising:
receiving third indication information from the EPDCCH on a fifth resource block, wherein the third indication information includes a sixth resource block for transmitting the cell common message;
wherein the first resource block and the fifth resource block are located on a same frequency band, and the first resource block and the fifth resource block are located on adjacent timeslots;
wherein the second resource block and the sixth resource block are located on a same frequency band, and the second resource block and the sixth resource block are located on adjacent time slots.

11. A method for data transmission in a base station, the base station being for transmitting data to a plurality of machine type communication device terminals, comprising:
performing the following when the base station transmits a first portion of a data transmission in a cell common message to the plurality of machine type communication device terminals:
transmitting first indication information from the base station to the plurality of machine type communication device terminals via an EPDCCH on a first resource block, wherein the first indication information indicates a second resource block for transmitting the first portion of the data transmission in the cell common message from the base station via a PDSCH; and
transmitting the first portion of the data transmission in the cell common message from the base station to the plurality of machine type communication device terminals via the PDSCH on the second resource block; and performing the following when the base station transmits a second portion of the data transmission in downlink data to at least a portion of the plurality of machine type communication device terminals, the portion of the plurality of machine type communication device terminals to which the downlink data in the second portion of the data transmission is transmitted needing to obtain the second portion of the data transmission in the downlink data:
assigning a downlink resource block for each machine type communication device terminal of the portion of machine type communication device terminals that need to obtain the second portion of the data transmission in the downlink data from the base station;
transmitting second indication information from the base station to the portion of machine type communication device terminals that need to obtain the second portion of the data transmission in the downlink data via the EPDCCH on a third resource block, the second indication information including DCI information for the machine type communication device terminals of the portion of machine type communication device terminals that need to obtain the second portion of the data transmission in the downlink data from the base station, respective DCI information indicating the downlink resource block assigned by the base station to the respective machine type communication device terminal for receiving the second portion of the data transmission in the downlink data from the base station via the PDSCH; and
transmitting the second portion of the data transmission in the downlink data from the base station to the portion of machine type communication device terminals that need to obtain the second portion of the data transmission in the downlink data via the PDSCH on the downlink resource block, respectively.

12. The method according to claim 11, wherein DCI information of the plurality of machine type communication device terminals is transmitted on the third resource block by frequency-division multiplexing.

13. The method according to claim 11, wherein DCI information of the plurality of machine type communication device terminals is transmitted on the third resource block by time-division multiplexing.

14. The method according to claim 13, wherein DCI information of the plurality of machine type communication device terminals is transmitted for multiple times on the third resource block by time-division multiplexing.

15. The method according to claim 11, wherein the first resource block, the second resource block, the third resource block, and the downlink resource block are located on different time slots.

16. The method according to claim 15, wherein a location of the first resource block in a frequency band is predetermined, and a frequency band location of the third resource block is notified by the base station to the plurality of machine type communication device terminals.

17. The method according to claim 15, wherein the first resource block and the third resource block are located on a same frequency band.

18. The method according to claim 15, wherein the third resource block and the downlink resource block are located on a same frequency band.

19. The method according to claim 11, further comprising:
- transmitting third indication information in the EPDCCH on a fifth resource block, wherein the third indication information includes a sixth resource block for transmitting the cell common message;
- wherein the first resource block and the fifth resource block are located on a same frequency band, and the first resource block and the fifth resource block are located on adjacent timeslots;
- wherein the second resource block and the sixth resource block are located on a same frequency band, and the second resource block and the sixth resource block are located on adjacent time slots.

20. The method according to claim 19, wherein the frequency band and time slot locations of the first resource block and the fifth resource block are notified by the base station to the corresponding machine type communication device terminals, respectively.

* * * * *